United States Patent
Fujishiro et al.

(10) Patent No.: US 9,888,447 B2
(45) Date of Patent: Feb. 6, 2018

(54) BASE STATION

(71) Applicant: KYOCERA CORPORATION, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/139,849

(22) Filed: Apr. 27, 2016

(65) Prior Publication Data

US 2016/0242126 A1    Aug. 18, 2016

Related U.S. Application Data

(63) Continuation of application No. PCT/JP2014/078243, filed on Oct. 23, 2014.

(30) Foreign Application Priority Data

Oct. 29, 2013    (JP) ................. 2013-224773

(51) Int. Cl.
*H04B 7/185* (2006.01)
*H04B 7/208* (2006.01)
(Continued)

(52) U.S. Cl.
CPC ......... *H04W 52/346* (2013.01); *H04W 16/28* (2013.01); *H04W 52/143* (2013.01);
(Continued)

(58) Field of Classification Search
CPC ............. H04W 52/00; H04W 72/0426; H04W 72/0406; H04W 72/02; H04W 72/005;
(Continued)

(56) References Cited

U.S. PATENT DOCUMENTS 9,155,082 B2 * 10/2015 Davydov .............. H04L 5/1469
2009/0264077 A1    10/2009 Damnjanovic
(Continued)

FOREIGN PATENT DOCUMENTS

| JP | 2011-518519 A | 6/2011 |
| WO | 2012/124715 A1 | 9/2012 |
| WO | 2013/129871 A1 | 9/2013 |

OTHER PUBLICATIONS

International Search Report issued in PCT/JP2014/078243; dated Jan. 27, 2015.
(Continued)

*Primary Examiner* — Hanh N Nguyen
(74) *Attorney, Agent, or Firm* — Studebaker & Brackett PC

(57) ABSTRACT

A base station includes: a controller configured to perform Coordinated Multi-Point (CoMP) communication with a user terminal; and a transmitter configured to transmit, to a neighbor base station, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid.

6 Claims, 7 Drawing Sheets

(51) Int. Cl.
*H04W 52/34* (2009.01)
*H04W 16/28* (2009.01)
*H04W 52/14* (2009.01)
*H04W 52/24* (2009.01)
*H04W 72/12* (2009.01)
*H04W 52/40* (2009.01)
*H04W 52/46* (2009.01)
*H04W 52/54* (2009.01)
*H04W 92/20* (2009.01)
*H04B 7/024* (2017.01)

(52) U.S. Cl.
CPC ......... *H04W 52/243* (2013.01); *H04W 52/34* (2013.01); *H04W 52/40* (2013.01); *H04W 52/46* (2013.01); *H04W 52/54* (2013.01); *H04W 72/1226* (2013.01); *H04B 7/024* (2013.01); *H04W 92/20* (2013.01)

(58) Field of Classification Search
CPC ............. H04W 72/0413; H04W 24/10; H04W 72/0446; H04W 36/04; H04W 36/06; H04W 36/08; H04L 5/0035; H04L 5/0073; H04L 5/006; H04L 5/0053; H04B 7/024; H04B 7/0626; H04B 7/063
USPC .................................. 370/328–332, 336–338
See application file for complete search history.

(56) References Cited

U.S. PATENT DOCUMENTS

| 2014/0254537 A1* | 9/2014 | Kim ...................... H04J 11/005 370/329 |
| 2014/0370908 A1 | 12/2014 | Lee et al. |
| 2015/0237518 A1* | 8/2015 | Seo ........................ H04W 24/10 455/452.1 |

OTHER PUBLICATIONS

Written Opinion issued in PCT/JP2014/078243; dated Jan. 27, 2015.
3rd Generation Partnership Project; Technical Specification Group Radio Access Network; Coordinated multi-point operation for LTE physical layer aspects (Release 11); 3GPP TR 36.819; V11.2.0; Sep. 2013; pp. 1-70; 3GPP Organizational Partners.
LG Electronics; "Discussions on interference coordination between CoMP clusters"; 3GPP TSG RAN WG1 Meeting #67; R1-113980; Nov. 14-18, 2011; pp. 1-5; San Francisco, USA.
Fujitsu; "Consideration on interference coordination for EPDCCH in small cell"; 3GPP TSG RAN WG1 Meeting #74; R1-133136; Aug. 19-23, 2013; pp. 1-6; Barcelona, Spain.
The extended European search report issued by the European Patent Office on Apr. 20, 2017, which corresponds to European Patent Application No. 14858572.2 and is related to U.S. Appl. No. 15/139,849; 9pp.

* cited by examiner

FIG. 9

| IE/Group Name | Presence | Range | IE type and reference | Semantics description | Criticality | Assigned Criticality |
|---|---|---|---|---|---|---|
| RNTP Per PRB | M | | BIT STRING (6..110, ...) | Each position in the bitmap represents a $n_{PRB}$ value (i.e. first bit=PRB 0 and so on), for which the bit value represents RNTP $(n_{PRB})$, defined in TS 36.213 [11]. Value 0 indicates "Tx not exceeding RNTP threshold". Value 1 indicates "no promise on the Tx power is given". | — | — |
| RNTP Threshold | M | | ENUMERATED (-∞, -11, -10, -9, -8, -7, -6, -5, -4, -3, -2, -1, 0, 1, 2, 3, ...) | $RNTP_{threshold}$ is defined in TS 36.213 [11]. | — | — |
| Number Of Cell-specific Antenna Ports | M | | ENUMERATED (1, 2, 4, ...) | P (number of antenna ports for cell-specific reference signals) defined in TS 36.211 [10] | — | — |
| P_B | M | | INTEGER (0..3, ...) | $P_B$ is defined in TS 36.213 [11]. | — | — |
| PDCCH Interference Impact | M | | INTEGER (0..4, ...) | Measured by Predicted Number Of Occupied PDCCH OFDM Symbols (see TS 36.211 [10]). Value 0 means "no prediction is available". | — | — |
| Subframe | O | | INTEGER | Subframe number that above information is available. | — | — |

BASE STATION

RELATED APPLICATIONS

This application is a continuation application of international application PCT/JP2014/078243, filed Oct. 23, 2014, which claims benefit of Japanese Patent Application No. 2013-224773, filed Oct. 29, 2013, the entirety of applications hereby expressly incorporated by reference.

TECHNICAL FIELD

The present disclosure relates to a base station used in a mobile communication system that supports CoMP communication.

BACKGROUND ART

In 3GPP (3rd Generation Partnership Project) that is a project aiming to standardize a mobile communication system, the standardization of CoMP (Coordinated Multi-Point) communication is in progress (see Non Patent Literature 1).

The CoMP communication is a communication mode in which an antenna group arranged in the same place is positioned as one "point" and a plurality of points coordinate with one another to perform communication with a user terminal A point group that performs communication with a user terminal by using one time-frequency resource is called a CoMP coordinating set.

CITATION LIST

Non Patent Literature

[NPL 1] 3GPP technical report "TR36.819 V11.2.0" September 2013

SUMMARY

A base station according to an embodiment includes: a controller configured to perform Coordinated Multi-Point (CoMP) communication with a user terminal; and a transmitter configured to transmit, to a neighbor base station, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid.

A base station according to an embodiment includes: a receiver configured to receive, from a neighbor base station performing Coordinated Multi-Point (CoMP) communication with a user terminal, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid. The base station further includes a controller configured to perform interference aware scheduling based on the transmission power information, wherein the controller determines that the restriction becomes valid starting from the start subframe.

BRIEF DESCRIPTION OF DRAWINGS

FIG. 9 is an explanatory diagram for describing an example of transmission power information according to the present embodiment.

DETAILED DESCRIPTION

Overview of Embodiments

Figure 1:
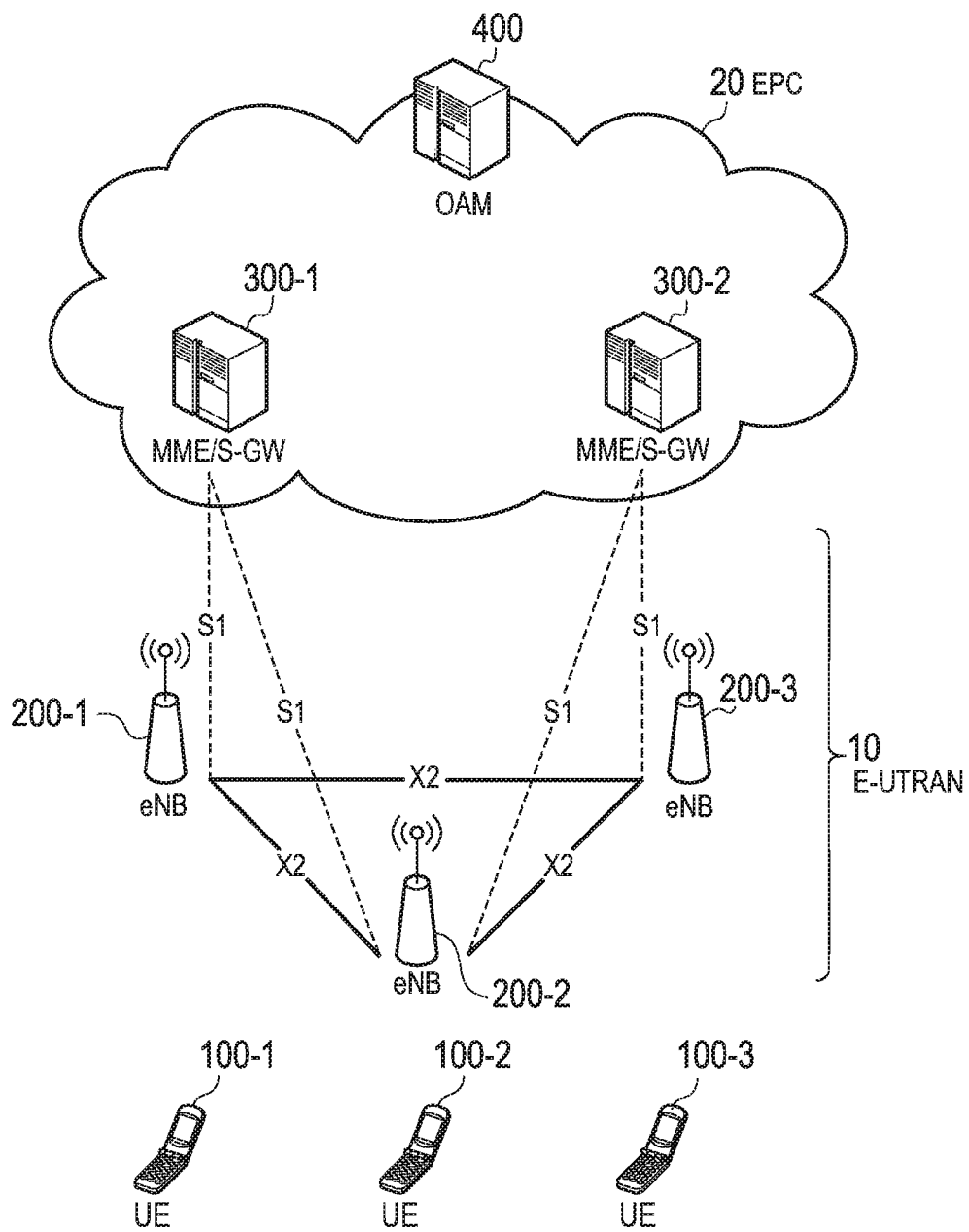
FIG. 1 is a configuration diagram of an LTE system.

A base station according to an embodiment includes: a controller configured to perform Coordinated Multi-Point (CoMP) communication with a user terminal; and a transmitter configured to transmit, to a neighbor base station, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid.

A base station according to an embodiment includes: a receiver configured to receive, from a neighbor base station performing Coordinated Multi-Point (CoMP) communication with a user terminal, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid. The base station further includes a controller configured to perform interference aware scheduling based on the transmission power information, wherein the controller determines that the restriction becomes valid starting from the start subframe.

A device according to an embodiment is a device to be equipped in a base station. The device includes processor and memory. The processor is configured to execute processes of: performing Coordinated Multi-Point (CoMP) communication with a user terminal; and transmitting, to a neighbor base station, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid.

A device according to an embodiment is a device to be equipped in a base station. The device includes processor and memory. The processor is configured to execute process of receiving, from a neighbor base station performing Coordinated Multi-Point (CoMP) communication with a user terminal, transmission power information that indicates restriction of downlink transmission power related to the CoMP communication. The transmission power information comprises: a threshold; a bit string that indicates, for each resource block, whether the downlink transmission power exceeds the threshold; and start subframe information that indicates a start subframe at which the restriction becomes valid. The processor is further configured to execute process of performing interference aware scheduling based on the transmission power information, wherein the processor determines that the restriction becomes valid starting from the start subframe.

A base station according to an embodiment is a base station that coordinates with a first neighboring base station to perform coordinated communication with a user terminal. The base station comprises a controller configured to secure, as a coordinated communication resource used for the coordinated communication, the same radio resource as a radio resource that the first neighboring base station secures for the coordinated communication; and a transmitter configured to transmit, to a second neighboring base station that does not perform the coordinated communication with the base station, transmission power information concerning transmission power of the base station corresponding to at least the coordinated communication resource.

In an embodiment, when only the first neighboring base station performs transmission to the user terminal by using the coordinated communication resource, the transmitter transmits, to the second neighboring base station, as the transmission power information, information indicating that the transmission power is equal to zero.

In an embodiment, when the base station and the first neighboring base station simultaneously perform transmission to the user terminal by using the coordinated communication resource, the controller decides to reduce the transmission power. The transmitter transmits, as the transmission power information, information concerning reduction in the transmission power to the second neighboring base station.

In an embodiment, the controller decides to increase the transmission power corresponding to the coordinated communication resource. The transmitter transmits, as the transmission power information, information concerning increase in the transmission power to the second neighboring base station.

In an embodiment, the transmission power information includes information indicating restriction on transmission power for each resource block and information indicating a subframe in which at least the coordinated communication resource is located.

In an embodiment, the controller records, on a neighboring cell list concerning a neighboring base station that exists around the base station, a base station that performs the coordinated communication with the base station. The controller transmits, on the basis of the neighboring cell list, the transmission power information to the second neighboring base station.

A base station according to an embodiment performs communication with a user terminal. The base station includes: a receiver configured to receive, from a neighboring base station that coordinates with another base station to perform coordinated communication and that does not coordinate with the base station to perform the coordinated communication with the user terminal, transmission power information concerning transmission power of the neighboring base station corresponding to a coordinated communication resource used for at least the coordinated communication; and a controller configured to allocate, on the basis of the transmission power information, a radio resource to the user terminal.

In an embodiment, the receiver receives, as the transmission power information, information indicating that the transmission power is equal to zero. When the user terminal receives an interference from the neighboring base station, the controller allocates, to the user terminal, the radio resource corresponding to the coordinated communication resource.

In an embodiment, the receiver receives, as the transmission power information, information concerning reduction in the transmission power. When the user terminal receives an interference from the neighboring base station, the controller allocates, to the user terminal, the radio resource corresponding to the coordinated communication resource.

In an embodiment, the receiver receives, as the transmission power information, information concerning increase in the transmission power. When the user terminal receives an interference from the neighboring base station, the controller allocates, to the user terminal, the radio resource different from a radio resource corresponding to the coordinated communication resource.

In an embodiment, the receiver receives the transmission power information that includes information indicating restriction on transmission power for each resource block and information indicating a subframe in which at least the coordinated communication resource is located. The controller allocates, on the basis of the information indicating the subframe, the radio resource to the user terminal.

In an embodiment, when determining that the user terminal is located at the edge of a cell, managed by the base station, on the neighboring base station side, the controller allocates the radio resource to the user terminal.

Embodiments

Hereinafter, with reference to the accompanying drawings, the following description will be provided for an embodiment when the present disclosure is applied to a mobile communication system (an LTE system) configured according to 3GPP standards.

(LTE System)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication apparatus and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 comprises a cell and performs radio communication with the UE 100 which establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a MME (Mobility Management Entity)/S-GW (Serving-Gateway) 300 and an OAM 400 (Operation and Maintenance).

The MME is a network node for performing various mobility controls for the UE 100, for example, and corresponds to a control station. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server apparatus managed by an operator and performs maintenance and monitoring of the E-UTRAN 10.

Next, the configurations of the UE 100 and the eNB 200 will be described.

Figure 2:
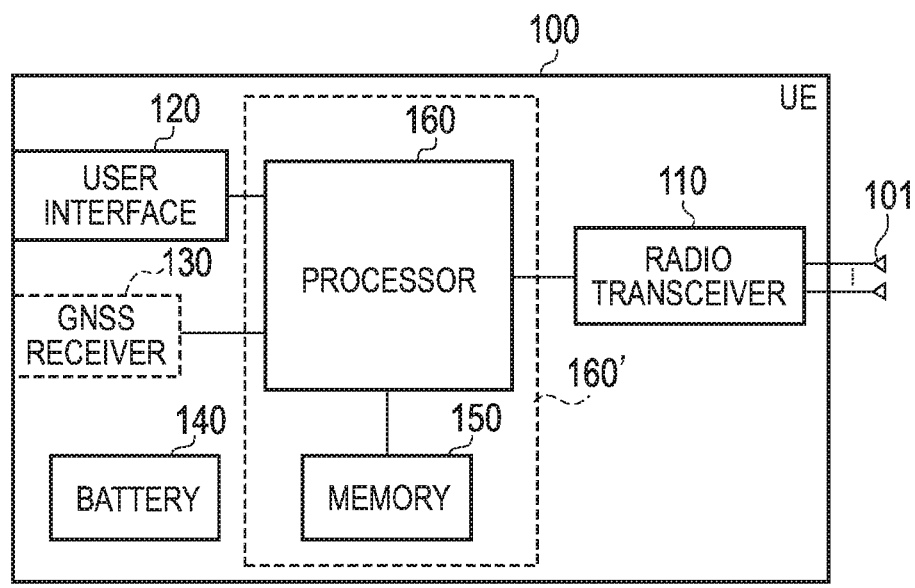
FIG. 2 is a block diagram of a UE.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 constitutes a storage and the processor 160 constitutes a controller.

The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal output from the processor 160 into the radio signal, and transmits the radio signal from the antennas 101. Furthermore, the radio transceiver 110 converts the radio signal received by the antennas 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

The processor 160 generates channel state information (CSI) on the basis of a signal received by the radio transceiver 110 (particularly, a reference signal), and then feeds back the channel state information to the serving cell. The channel state information includes PMI (Precoding Matrix Indicator), RI (Rank Indicator), and CQI (Channel Quality Indicator), for example.

An "entire downlink band" or a "subband" is stipulated as the frequency unit (the target frequency band) that is to be fed back, and which one of these to use is determined in accordance with the instruction from the eNB 200. A subband is a frequency unit obtained by dividing the entire downlink band, and has the bandwidth of a plurality of resource blocks. The details of the information that is fed back (such as the PMI, the RI, and the CQI) are described later.

Figure 3:
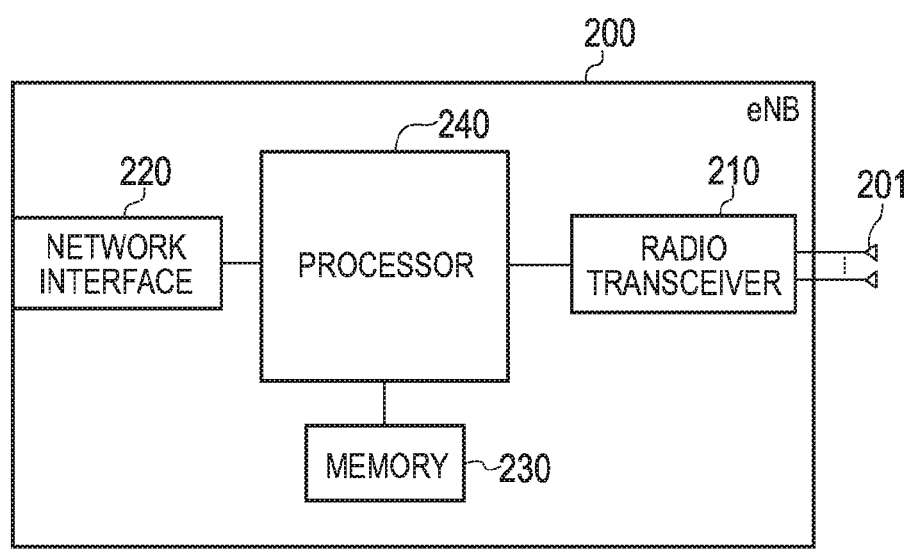
FIG. 3 is a block diagram of an eNB.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 constitutes a storage and the processor 240 constitutes a controller. The memory 230 may be integrally formed with the processor 240, and this set (that is, a chipset) may be called a processor 240'.

The antennas 201 and the radio transceiver 210 are used to transmit and receive a radio signal. The radio transceiver 210 converts the baseband signal output from the processor 240 into the radio signal, and transmits the radio signal from the antennas 201. Furthermore, the radio transceiver 210 converts the radio signal received by the antennas 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding and the like of the baseband signal and a CPU that performs various processes by executing the program stored in the memory 230. The processor 240 implements various processes and various communication protocols described later.

Figure 4:
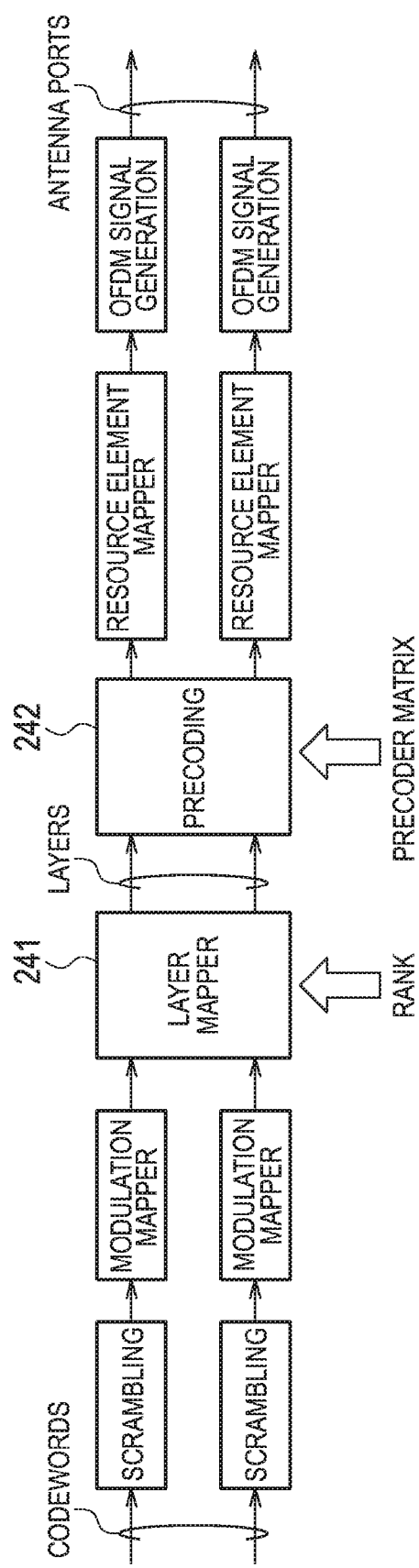
FIG. 4 is a block diagram related to downlink multi-antenna transmission.

The processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted on a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using the precoder matrix. The precoder matrix is determined on the basis of the PMI that is fed back. The precoded modulation symbol is mapped to a resource element, is converted into an OFDM signal of a temporal domain, and is output to each antenna port.

Figure 5:
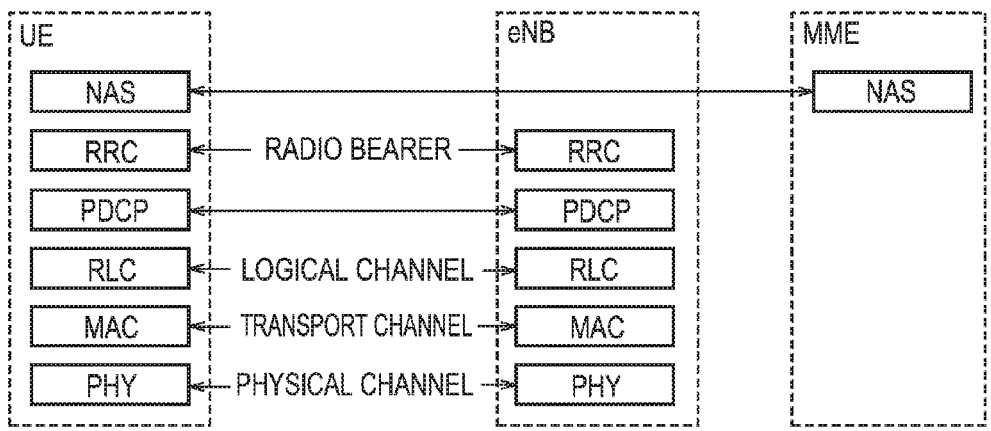
FIG. 5 is a protocol stack diagram of a radio interface in the LTE system.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process by hybrid ARQ (an HARQ) and the like. Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an allocation resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state (a RRC Connected state), and when the RRC connection is not established, the UE 100 is in an idle state (a RRC Idle state).

A NAS (Non-Access Stratum) layer positioned above the RRC layer performs session management or mobility management, for example.

Figure 6:
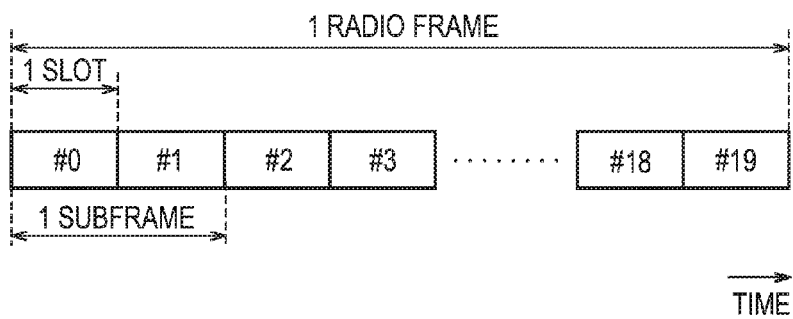
FIG. 6 is a configuration diagram of a radio frame used in the LTE system.

FIG. 6 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink.

As a duplex scheme, either an FDD (Frequency Division Duplex) scheme or a TDD (Time Division Duplex) scheme is used. However, in the first embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources allocated to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, a reference signal such as a cell-specific reference signal (CRS) is distributed and arranged in each subframe.

The PDCCH carries control information. The control information, for example, includes the uplink SI (Scheduling Information), the downlink SI, and a TPC bit. The uplink SI is information indicating the allocation of uplink radio resources, and the downlink SI is information indicating the allocation of downlink radio resources. The TPC bit is information for instructing an increase or decrease in the uplink transmission power.

The PDSCH carries the control information and/or user data. For example, a downlink data region may be allocated only to the user data, or may be allocated such that the user data and the control information are multiplexed.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

The PUCCH carries control information. The control information includes, for example, the CQI, the PMI, the RI, SR (Scheduling Request), and ACK/NACK.

The CQI indicates a modulation and coding scheme (that is, a recommended MCS) that is preferably used in the downlink, on the basis of the reception status of the downlink.

The PMI is information indicating a precoder matrix that is preferably used in the downlink. In other words, the PMI is information indicating a precoder matrix in which a beam is directed toward the UE serving as a transmission source of the PMI. For example, in order for the reception status of the UE 100 to be improved, the UE 100 selects the PMI to be fed back to the eNB 200.

The RI indicates a rank that is preferably used in the downlink. For example, in order for the rank corresponding to the reception status of the UE 100 to be applied, the UE 100 selects the PMI to be fed back to the eNB 200.

The SR is information for requesting the allocation of uplink radio resources.

The ACK/NACK is information indicating whether or not the decoding of a signal transmitted via a downlink physical channel (for example, PDSCH) is successful.

The PUSCH is a physical channel that carries the control information and/or user data. For example, an uplink data region may be allocated only to the user data, or may be allocated such that the user data and the control information are multiplexed.

Operation According to Embodiment

Hereinafter, an operation according to the embodiment will be described with reference to FIG. 7 and FIG. 8.

Figure 7:
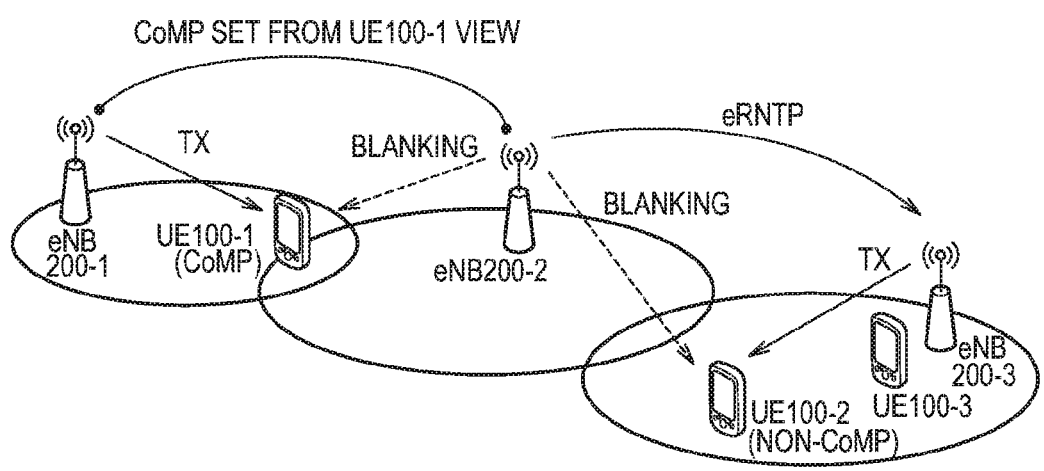
FIG. 7 is an explanatory diagram for describing an operation overview according to the present embodiment.

FIG. 7 is an explanatory diagram for describing an operation overview according to the present embodiment. FIG. 8 is a sequence diagram for describing an operation sequence according to the present embodiment.

As shown in FIG. 7, the mobile communication system according to the present embodiment has a UE 100-1, a UE 100-2, a UE 100-3, an eNB 200-1, an eNB 200-2, and an eNB 200-3.

Figure 8:
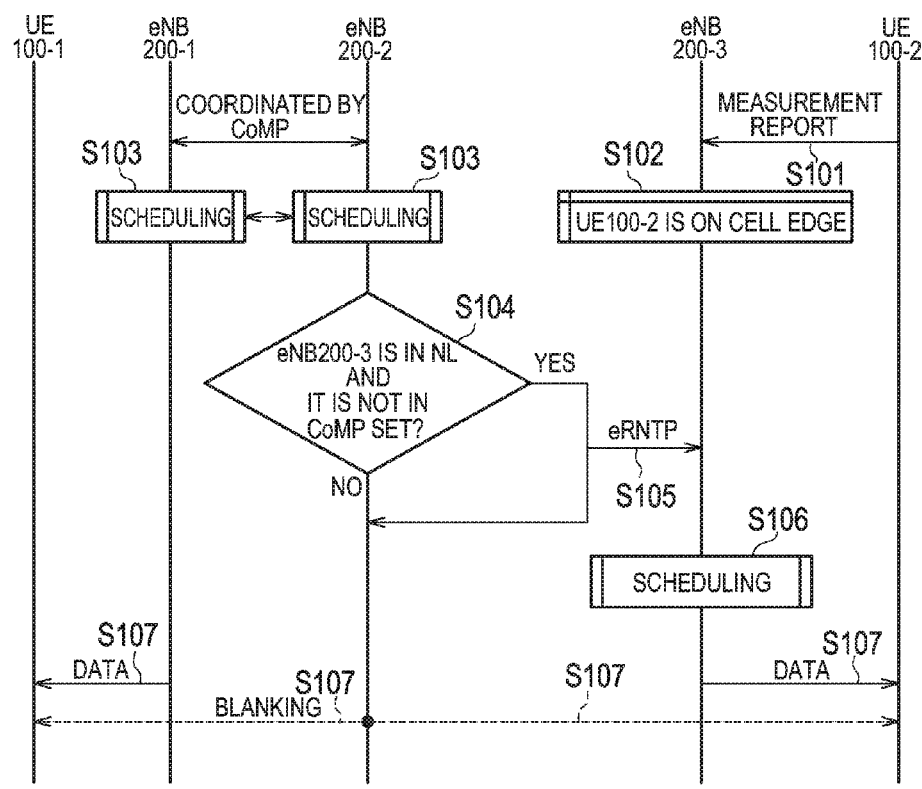
FIG. 8 is a sequence diagram for describing an operation sequence according to the present embodiment.

As shown in FIG. 7 and FIG. 8, the eNB 200-1 and the eNB 200-2 are included in a CoMP coordinating set and perform CoMP communication with the UE 100-1. Specifically, the eNB 200-1 and the eNB 200-2 perform CoMP communication of a DPS (Dynamic Point Selection) scheme in which a plurality of points selectively perform transmission to a user terminal with securing the same radio resource. On the other hand, the eNB 200-3 performs normal communication with the UE 100-2 and the UE 100-3 that are subordinate of a cell managed by the eNB 200-3. That is, the eNB 200-3 is not included in the CoMP coordinating set.

The UE 100-2 is located at the edge of the cell of the eNB 200-3, and the UE 100-3 is located near the center of the cell of the eNB 200-3.

As shown in FIG. 8, in step S101, the UE 100-2 transmits, to the eNB 200-3, a measurement report in which a reception state (received power and/or reception quality) of a reference signal from the eNB 200 is measured. The eNB 200-3 receives the measurement report from the UE 100-2.

In step S102, the eNB 200-3 determines, on the basis of the measurement report, whether or not the UE 100-2 is located at the edge of a cell managed by the eNB 200-3 (on the eNB 200-2 side). For example, when the received power from the eNB 200-2 is equal to or more than a predetermined value, the eNB 200-3 determines that the UE 100-2 is located at the edge of the cell of the eNB 200-3 on the eNB 200-2 side. In the present embodiment, description will be given on an assumption that the eNB 200-3 determines that the UE 100-2 is located at the edge of the cell of the eNB 200-3 on the eNB 200-2 side.

In step 103, each of the eNB 200-1 and the eNB 200-2 performs scheduling for allocating a radio resource to a UE 100 that is a subordinate of the eNB 200-1 and the eNB 200-2. Furthermore, the eNB 200-1 and the eNB 200-2 exchange scheduling information that is allocation information of the allocated radio resource. As a result, each of the eNB 200-1 and the eNB 200-2 secures the same radio resource used for the CoMP communication (hereinafter, referred to as CoMP communication resource).

In step S104, the eNB 200-2 searches, on the basis of a neighboring cell list on neighboring eNBs 200-1 and 200-3 that exist around the eNB 200-2, an eNB 200-3 that is a neighboring eNB 200 of the eNB 200-2 and is not included in the CoMP coordinating set with the eNB 200-2.

In the present embodiment, the eNB 200-2 records, on the neighboring cell list, not only a neighboring eNB 200-3 of the eNB 200-2 but also an eNB 200-1 performing CoMP communication with the eNB 200-2.

In the present embodiment, the eNB 200-2 determines, on the basis of the neighboring cell list on which an eNB 200 performing CoMP communication with the eNB 200-2 is recorded, whether or not the eNB 200-3 is a neighboring eNB 200 and whether or not the eNB 200-3 is included in the CoMP coordinating set.

The CoMP coordinating set in this case may be an eNB 200 that is a target of coordinated transmission with the eNB 200-2 and may be an eNB 200 that currently performs coordinated transmission with the eNB 200-2, for example. In the present embodiment, description will be given such that the eNB 200-2 regards an eNB 200 that currently performs coordinated transmission with the eNB 200-2 as the CoMP coordinating set.

When determining that the eNB 200-3 is a neighboring eNB 200 and is not included in the CoMP coordinating set (when "YES"), the eNB 200-2 executes the process in step S105. On the other hand, when determining that the eNB 200-3 is not a neighboring eNB 200 or the eNB 200-3 is included in the CoMP coordinating set (when "NO"), the eNB 200-2 executes the process in step S107. In the present embodiment, description will be given on an assumption that the eNB 200-2 determines that the eNB 200-3 is a neighboring eNB 200 and is not included in the CoMP coordinating set.

In step S105, the eNB 200-2 transmits, to the eNB 200-3, transmission power information concerning transmission power of the eNB 200-2 corresponding to at least the CoMP communication resource. The eNB 200-3 receives the transmission power information.

In the present embodiment, the transmission power information is eRNTP (enhanced Relative Narrowband Tx Power). The eRNTP includes restriction information indicating restriction on downlink transmission power of the eNB 200-2 for each resource block, and subframe information indicating a subframe concerning the restriction information. The subframe information includes information indicating a subframe in which at least the CoMP communication resource is located.

In the present embodiment, the restriction information includes information indicating a radio resource of which transmission power is equal to zero.

Furthermore, the subframe information is, for example, as shown in FIG. 9, information specifying a single subframe in which the eRNTP is effective. Alternatively, the subframe information may be information specifying a range of subframe in which the eRNTP is effective. In this case, IE may be divided into a subframe start and a subframe end. Furthermore, the subframe information may be information specifying a subframe period during which the eRNTP is effective. In this case, for example, (a) the subframe information may be information specifying a subframe start and a subframe period, (b) the subframe information may be information specifying a subframe denominator (subframe modulo) and a subframe of which a subframe number that can be divided by the subframe denominator is determined as a subframe in which the eRNTP is effective, or (c) the subframe information may be information specifying a subframe offset. It is noted that the subframe information may be information formed by combining (a) to (c), and the eNB 200-2 may transmit each of the information of (a) to (c).

It is noted that for example, when the eNB 200-2 performs CS-CoMP communication in which semi-persistent scheduling (SPS) is performed, the eNB 200-2 is capable of transmitting, as the subframe information, the information specifying a subframe period during which the eRNTP is effective. It is noted that in the CS (Coordinated Scheduling)-CoMP communication, coordinated scheduling is performed among each eNB 200 that is included in the CoMP coordinating set.

In step S106, the eNB 200-3 performs scheduling on the basis of the transmission power information.

In the present embodiment, the eNB 200-3 allocates a radio resource corresponding to the CoMP communication resource, to the UE 100-2, the UE 100-2 being determined to be located at the edge of the cell of the eNB 200-3 on the eNB 200-2 side. Specifically, the eNB 200-3 allocates, to the UE 100-2, a radio resource of which the transmission power of the eNB 200-2 is equal to zero.

In step S107, the eNB 200-1 and the eNB 200-2 perform communication with the UE 100-1 by the CoMP communication. Specifically, only the eNB 200-1 transmits data to the UE 100-1 by using the CoMP communication resource, and the eNB 200-2 does not perform transmission by using the CoMP communication resource. On the other hand, the eNB 200-3 transmits data to the UE 100-2 by using the radio resource corresponding to the CoMP communication resource.

Summary of Embodiment

In the present embodiment, the eNB 200-2 secures the same radio resource as the CoMP communication resource that the eNB 200-1 secures for the coordinated communication. The eNB 200-2 transmits, to the eNB 200-3, the transmission power information concerning the transmission power of the eNB 200-2 corresponding to at least the CoMP communication resource. Furthermore, the eNB 200-3 receives the transmission power information from the eNB 200-2. The eNB 200-3 allocates a radio resource to the UE 100-2 on the basis of the transmission power information. As a result, the eNB 200-2 is capable of recognizing the radio resource corresponding to the CoMP communication resource of which the transmission power is regulated, and thus, the eNB 200-3 takes the CoMP communication resource into consideration, then the eNB 200-3 is capable of allocating a radio resource to the UE 100-2 such that the interference from the eNB 200-2 to the UE 100-2 can be suppressed. When the eNB 200-3 that is not included in the CoMP coordinating set actively utilizes the radio resource corresponding to the CoMP communication resource, then a throughput in the eNB 200-3 is improved, and thus, it is possible to improve the system capacity.

Furthermore, in the present embodiment, when the eNB 200-1 performs transmission to the UE 100-1 by using the CoMP communication resource, to the UE 100-1, the eNB 200-2 transmits, to the eNB 200-3, as the transmission power information, information indicating that the transmission power of the eNB 200-2 is equal to zero. The eNB 200-3 receives the transmission power information. When the UE 100-2 receives an interference from the eNB 200-2 (specifically, when the received power from the eNB 200-2 is equal to or more than a predetermined value), the eNB 200-3 allocates, to the UE 100-2, a radio resource corresponding to the CoMP communication resource. As a result, the interference from the eNB 200-2 to the UE 100-2 can be suppressed, and thus, a throughput in the eNB 200-3 improves, then it is possible to improve the system capacity.

Furthermore, in the present embodiment, the transmission power information includes information indicating restriction on transmission power of the eNB 200-2 for each resource block, and information indicating a subframe in which at least the CoMP communication resource is located. Furthermore, the eNB 200-2 is capable of allocating a radio resource to the UE 100-2 on the basis of the information indicating the subframe. As a result, the eNB 200-2 is capable of recognizing the subframe in which the CoMP communication resource is located, and thus, it is possible to appropriately allocate, to the UE 100-2, a radio resource corresponding to the CoMP communication resource.

Furthermore, in the present embodiment, the eNB 200-2 records, on the neighboring cell list, an eNB 200 performing the CoMP communication with the eNB 200-2. The eNB 200-2 transmits the transmission power information to the eNB 200-3 on the basis of the neighboring cell list. As a result, the eNB 200-2 is capable of restraining from transmitting the transmission power information to an eNB 200 that is not a neighboring eNB 200 of the eNB 200-2 or to an eNB 200 performing the CoMP communication with the eNB 200-2. As a result, the eNB 200-2 is capable of restraining from transmitting unnecessary information to another eNB 200, and thus, it is possible to improve the system capacity.

Furthermore, in the present embodiment, when determining that the UE 100-2 is located at the edge of the cell of the eNB 200-3 on the eNB 200-2 side, the eNB 200-3 allocates, to the UE 100-2, a radio resource corresponding to the CoMP communication resource. As a result, the radio resource corresponding to the CoMP communication resource can be allocated to a UE 100 that easily receives an interference from the eNB 200-2, and thus, it is possible to obtain an effect of effective interference containment.

First Modification of Embodiment

Next, an operation according to a first modification of the present embodiment will be described. It is noted that a description will be provided while focusing on a portion different from the above-described embodiment, and a description of a similar portion will be omitted, where necessary.

In the above-described embodiment, the eNB 200-1 and the eNB 200-2 perform the CoMP communication of the DPS scheme (DPS-CoMP); however, in the present modification, the eNB 200-1 and the eNB 200-2 perform JT-CoMP in which a plurality of points simultaneously perform transmission to a UE 100 by using the same radio resource.

When performing the JT-CoMP, the eNB 200-1 and the eNB 200-2 decide to reduce the transmission power. Each of the eNB 200-1 and the eNB 200-2 decides to perform the JT-CoMP by reducing the transmission power by a predetermined value (for example, 3 dB).

The eNB 200-2 transmits, to the eNB 200-3, as the transmission power information, information indicating the predetermined value and the CoMP communication resource of which the transmission power is reduced. The eNB 200-3 allocates, on the basis of the received transmission power information, a radio resource corresponding to the CoMP communication resource, to the UE 100-2.

The eNB 200-1 and the eNB 200-2 transmit data to the UE 100-1 by using the CoMP communication resource. On the other hand, the eNB 200-3 transmits data to the UE 100-2 by using the radio resource corresponding to the CoMP communication resource. As a result, the transmission power from the eNB 200-2 is reduced in the radio resource, and thus, the interference from the eNB 200-2 received in the UE 100-2 is reduced. Consequently, a throughput in the eNB 200-3 improves, and thus, it is possible to improve the system capacity.

Second Modification of Embodiment

Next, an operation according to a second modification of the present embodiment will be described. It is noted that a description will be provided while focusing on a portion different from the above-described embodiment, and a description of a similar portion will be omitted, where necessary.

In above-described embodiment, the information indicating restriction on the transmission power for each resource block is transmitted as the transmission power information. In the present embodiment, the transmission power information is information concerning increase in transmission power.

In the present embodiment, the eNB 200-1 decides to increase transmission power corresponding to the CoMP communication resource. The eNB 200-1 transmits, as the transmission power information, the information concerning increase in transmission power, to an eNB 200-4 (not shown in the figure) that is a neighboring eNB 200 of the eNB 200-1 and that does not perform the CoMP communication with the eNB 200-1. In the present modification, the information concerning increase in transmission power is information indicating increase in transmission power of the eNB 200-1 for each resource block.

The eNB 200-4 receives the transmission power information, and allocates, on the basis of the transmission power information, a radio resource different from the radio resource corresponding to the CoMP communication resource, to a UE 100 that receives an interference from the eNB 200-1. As a result, the eNB 200-4 is capable of performing allocation to a UE 100 by avoiding a radio resource that receives the interference from the eNB 200-1, and thus, a throughput in the eNB 200-4 is improved. Consequently, it is possible to improve the system capacity.

Other Embodiments

As described above, the present disclosure has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the above-described embodiment, the eNB 200-2 may transmit transmission power information concerning transmission power of the eNB 200-2 corresponding to only the CoMP communication resource. Furthermore, the eNB 200-2 may transmit, as the transmission power information, information indicating an ABS (Almost Blank Subframe), not the eRNTP.

In the above-described embodiment, the eNB 200-3 determines, on the basis of the measurement report, whether or not the UE 100-2 is located at the edge of the cell on the eNB 200-2 side; however, this is not limiting. The eNB 200-3 may make such a determination on the basis of location information of the UE 100-2, for example.

Furthermore, to a UE 100 located at the edge of the cell of the eNB 200-3 on the eNB 200-2 side, the eNB 200-3 may transmit, to the UE 100-2, setting information for transmitting a measurement report in which the eNB 200-2 and the eNB 200-3 are regarded as a CoMP coordinating set. As a result, for the UE 100-2, a measurement target is usually a cell-specific reference signal (CRS: Cell-specific RS) as a radio signal from a neighboring cell (eNB 200-2); however, a channel-state-information reference signal (CSI-RS: Channel State Information RS) becomes the measurement target. The eNB 200-3 is capable of transmitting the setting information to the UE 100-2, even though the eNB 200-2 and the eNB 200-3 are not included in the CoMP coordinating set. As a result, the eNB 200-3 receives, from the UE 100-2, the measurement report in which the measurement target is the CSI-RS, and thus, it is possible to decide an accurate MCS for the UE 100-2, in which an interference from the eNB 200-2 is considered. It is noted that even when not receiving the measurement report in which the measurement target is the CSI-RS of the eNB 200-2, the eNB 200-3 may readily decide an MCS for the UE 100-2, on the basis of RSRP of the eNB 200-2 obtained by a normal measurement report. As a result, it is possible to improve the system capacity.

In the above-described embodiment, the eNB 200-2 records an eNB 200 performing the CoMP communication with the eNB 200-2 on the neighboring cell list; however, an eNB 200 performing the CoMP communication with the eNB 200-2 may be recorded on a list different from the neighboring cell list.

Furthermore, in the above-described embodiment, the eNB 200-2 may transmit the transmission power information to an eNB 200 recorded on the neighboring cell list, without determining whether or not the eNB 200 is included in the CoMP coordinating set with the eNB 200-2.

In the above-described embodiment, the eNB 200-2 and the eNB 200-3 are in a relationship of a neighboring eNB 200 with each other, and a cell managed by the eNB 200-2 (hereinafter, referred to as second cell, where necessary) and a cell managed by the eNB 200-3 (hereinafter, referred to as third cell, where necessary) are adjacent; however, this is not limiting. For example, the eNB 200-3 may be installed within the second cell and the third cell may be a cell having a smaller coverage than that of the second cell. Therefore, the eNB 200-2 may be an eNB 200 that manages a macro cell, and the eNB 200-3 may be an eNB 200 that manages a pico cell or a femto cell.

Moreover, when the eNB 200-3 supports a dual connectivity scheme in which two eNBs 200 establish connection (RRC connection/data path) with the same UE 100, and when dual connectivity with the same UE 100 is available for the eNB 200-2 and the eNB 200-3, the eNB 200-2 may transmit the transmission power information to the eNB 200-3. The eNB 200-3 is capable of allocating, on the basis of the transmission power information, a radio resource corresponding to the CoMP communication resource (or a radio resource different from the radio resource corresponding to the CoMP communication resource) to the UE 100 with which the dual connectivity is performed.

Furthermore, in the above-described embodiment, the eNB 200-2 transmits the transmission power information to the neighboring eNB 200; however, this is not limiting. For example, among from a plurality of UEs 100 performing D2D communication that is direct device-to-device communication, the eNB 200-2 may transmit the transmission power information to a scheduling UE that performs allocation of a radio resource used in the D2D communication.

Specifically, the eNB 200-2 may transmit the transmission power information to a scheduling UE located within the second cell, or the eNB 200-2 may transmit, via the eNB 200-3, the transmission power information to a scheduling UE located within the third cell.

The scheduling UE is capable of allocating, on the basis of the transmission power information, a radio resource corresponding to the CoMP communication resource (or a radio resource different from the radio resource corresponding to the CoMP communication resource) to a UE 100 that configures a group to which the scheduling UE belongs. The UE 100 to which the radio resource is allocated performs the D2D communication by using the radio resource.

It is noted that the scheduling UE is capable of executing a similar operation with the eNB 200-3 according to the above-described embodiment (see FIG. 8). It is noted that in this case, operations in the above-described step S101 and step S102 may be omitted. The operation in step S107 may be an operation of the scheduling UE or may be an operation of the UE 100 to which the radio resource is allocated.

Further, in the above-described embodiment, an example of applying the present invention to the LTE system is described; however, the present invention is not limited thereto, and the present invention may be applied to a system other than the LTE system.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

INDUSTRIAL APPLICABILITY

As described above, the base station according to the present disclosure possible to increase system capacity when CoMP communication is performed, thus they are useful in the mobile communication field.

The invention claimed is:

1. A base station comprising:
a controller configured to perform Coordinated Multi-Point (CoMP) communication with a user terminal using a radio frame configuration including a plurality of subframes arranged in a time domain, wherein each subframe has a subframe number, and each subframe includes a plurality of resource blocks arranged in a frequency domain; and
a transmitter configured to transmit, to a neighbor base station, a single message that indicates restriction of downlink transmission power of the base station in the CoMP communication, the restriction being a frequency domain restriction in which the downlink transmission power is restricted per resource block, wherein the single message comprises:
restriction information including:
a threshold value; and
a bit string that indicates, for each resource block, whether the downlink transmission power exceeds the threshold value; and
subframe information including:
a start subframe number, selected from among the plurality of subframes, at which the frequency domain restriction, as indicated by the bit string, becomes valid; and
subframe period information indicating a period of subframes over which the frequency domain restriction is active, including the start subframe number, such that the valid time of the frequency domain restriction can be known by the neighbor base station, and
wherein the single message is configured to cause the neighbor base station to perform scheduling upon receiving the single message.

2. The base station according to claim 1, wherein the controller is further configured to start the frequency domain restriction indicated by the single message at a subframe indicated by the subframe number.

3. A base station using a radio frame configuration including a plurality of subframes arranged in a time domain, wherein each subframe has a subframe number, and each subframe includes a plurality of resource blocks arranged in a frequency domain, the base station comprising:
a receiver configured to receive, from a neighbor base station performing Coordinated Multi-Point (CoMP) communication with a user terminal, a single message that restriction of downlink transmission power of the base station in the CoMP communication, the restriction being a frequency domain restriction in which the downlink transmission power is restricted per resource block, wherein
the single message comprises:
restriction information including:
a threshold value; and
a bit string that indicates, for each resource block, whether the downlink transmission power exceeds the threshold value; and
subframe information including:
a start subframe number, selected from among the plurality of subframes, at which the frequency domain restriction, as indicated by the bit string, becomes valid; and
subframe period information indicating a period of subframes over which the frequency domain restriction is active, including the start subframe number, such that the valid time of the frequency domain restriction can be known by the neighbor base station, and
a controller configured to perform scheduling based on the single message, wherein the controller determines that the frequency domain restriction becomes valid starting from the start subframe.

4. The base station according to claim 3, wherein the controller is further configured to start using the threshold value and the bit string at a subframe indicated by the subframe number.

5. A chipset to be equipped in a base station, comprising:
a processor and a memory, the processor configured to execute instructions stored in the memory to perform processes of:
performing Coordinated Multi-Point (CoMP) communication with a user terminal using a radio frame configuration including a plurality of subframes arranged in a time domain, wherein each subframe has a subframe number, and each subframe includes a plurality of resource blocks arranged in a frequency domain; and
transmitting, to a neighbor base station, a single message that indicates restriction of downlink transmission power of the base station in the CoMP communication, the frequency domain restriction being a frequency domain restriction in which the downlink transmission power is restricted per resource block, wherein
the single message comprises:
restriction information including:
a threshold value; and
a bit string that indicates, for each resource block, whether the downlink transmission power exceeds the threshold value; and
subframe information including:
a start subframe number, selected from among the plurality of subframes, at which the frequency domain restriction, as indicated by the bit string, becomes valid; and
subframe period information indicating a period of subframes over which the frequency domain restriction is active, including the start subframe number, such that the valid time of the frequency domain restriction can be known by the neighbor base station, and
wherein the single message is configured to cause the neighbor base station to perform scheduling upon receiving the single message.

6. A chipset to be equipped in a base station using a radio frame configuration including a plurality of subframes arranged in a time domain, wherein each subframe has a subframe number, and each subframe includes a plurality of resource blocks arranged in a frequency domain, the chipset comprising:
a processor and a memory, the processor configured to execute instructions stored in the memory to perform processes of:

receiving, from a neighbor base station performing Coordinated Multi-Point (CoMP) communication with a user terminal, a single message that indicates restriction of downlink transmission power of the base station in the CoMP communication, the restriction being a frequency domain restriction in which the downlink transmission power is restricted per resource block, wherein the single message comprises:
  restriction information including:
    a threshold value; and
    a bit string that indicates, for each resource block, whether the downlink transmission power exceeds the threshold value; and
  subframe information including:
    a start subframe number, selected from among the plurality of subframes, at which the frequency domain restriction, as indicated by the bit string, becomes valid; and
    subframe period information indicating a period of subframes over which the frequency domain restriction is active, including the start subframe number, such that the valid time of the frequency domain restriction can be known by the neighbor base station, and
  performing scheduling based on the single message, wherein the processor determines that the frequency domain restriction becomes valid starting from the start subframe.

* * * * *